(12) United States Patent
Menendez-Pidal et al.

(10) Patent No.: US 10,714,076 B2
(45) Date of Patent: Jul. 14, 2020

(54) INITIALIZATION OF CTC SPEECH RECOGNITION WITH STANDARD HMM

(71) Applicant: Sony Interactive Entertainment Inc., Tokyo (JP)

(72) Inventors: Xavier Menendez-Pidal, Campbell, CA (US); Ruxin Chen, Redwood City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 21 days.

(21) Appl. No.: 15/645,985

(22) Filed: Jul. 10, 2017

(65) Prior Publication Data

US 2019/0013015 A1    Jan. 10, 2019

(51) Int. Cl.
*G10L 15/00* (2013.01)
*G10L 15/16* (2006.01)
(Continued)

(52) U.S. Cl.
CPC .......... *G10L 15/144* (2013.01); *G10L 15/02* (2013.01); *G10L 15/063* (2013.01); *G10L 15/16* (2013.01); *G10L 2015/025* (2013.01)

(58) Field of Classification Search
CPC .......... G06F 17/2765; G06F 17/30979; G06F 19/00; G06F 3/0237; G06F 3/0219; G06F 3/0233; G06F 3/0482; G06F 3/04883; G06F 3/04886; G06F 3/04895; G06F 40/232; G06F 40/274; G06F 40/279; G10L 15/16; G10L 15/063; G10L 15/08; G10L 15/144; G10L 15/187; G10L 15/26; G10L 17/02; G10L 17/04; G10L 17/18;
(Continued)

(56) References Cited

U.S. PATENT DOCUMENTS

| | | | |
|---|---|---|---|
| 9,678,664 B2* | 6/2017 | Zhai | G06F 3/0219 |
| 9,786,270 B2* | 10/2017 | Senior | G10L 15/063 |
| 9,886,957 B2* | 2/2018 | Seo | G10L 15/144 |
| 10,052,026 B1* | 8/2018 | Tran | G16H 50/30 |

(Continued)

OTHER PUBLICATIONS

M. Wollmer, F. Eyben, B. Schuller, and G. Rigoll, "Spoken term detection with connectionist temporal classification—a novel hybrid CTC-DBN decoder," in Proc. of ICASSP, Dallas, Texas, 2010, pp. 5274-5277.*

(Continued)

*Primary Examiner* — Michael Ortiz-Sanchez
(74) *Attorney, Agent, or Firm* — JDI Patent; Joshua D. Isenberg; Robert Pullman

(57) ABSTRACT

A method for improved initialization of speech recognition system comprises mapping a trained hidden markov model based recognition node network (HMM) to a Connectionist Temporal Classification (CTC) based node label scheme. The central state of each frame in the HMM are mapped to CTC-labeled output nodes and the non-central states of each frame are mapped to CTC-blank nodes to generate a CTC-labeled HMM and each central state represents a phoneme from human speech detected and extracted by a computing device. Next the CTC-labeled HMM is trained using a cost function, wherein the cost function is not part of a CTC cost function. Finally the CTC-labeled HMM is trained using a CTC cost function to produce a CTC node network. The CTC node network may be iteratively trained by repeating the initialization steps.

20 Claims, 5 Drawing Sheets

(51) Int. Cl.
*G10L 15/14* (2006.01)
*G10L 15/02* (2006.01)
*G10L 15/06* (2013.01)

(58) Field of Classification Search
CPC ............... G10L 2015/088; G10L 15/02; G10L 2015/025; G06N 3/0445; G06N 3/08
See application file for complete search history.

(56) References Cited

U.S. PATENT DOCUMENTS

| 10,229,672 | B1* | 3/2019 | Rao | G10L 15/16 |
| 2017/0125020 | A1* | 5/2017 | Seo | G10L 15/144 |
| 2017/0199665 | A1* | 7/2017 | Zhai | G06F 40/279 |
| 2018/0061439 | A1* | 3/2018 | Diamos | G10L 21/10 |

OTHER PUBLICATIONS

A. Zeyer, E. Beck, R. Schluter, and H. Ney, "CTC in the context of generalized full-sum HMM training," in Proceedings of Interspeech, 2017, pp. 944-948. (Year: 2017).*

Abahinav Thanda, "Audio Visual Speech Recognition using Deep Recurrent Neural Networks" Nov. 2016.

Alex Graves, "Connectionist Temporal Classification: Labeling Unsegmented Sequence Data with Recurrent Neural Networks" Proceedings of the 23rd International Conference on Machine Learning, 2006.

Andrew Gibiansky, "Recurrent Neural Networks", Mar. 21, 2014 Math=>Code Available at: http://andrew.gibiansky.com/blog/machine-learning/recurrent-neural-networks/.

Denny Britz, "Recurrent Neural Networks Tutorial, Part 2 Implementing a RNN With Python, Numpy, Andtheano" Sep. 30, 2015, Wild ML, Available at: http://www.wildml.com/2015/09/recurrent-neural-networks-tutorial-part-2-implementing-a-language-model-rnn-with-python-numpy-and-theano/.

Mark Gales, "The Application of Hidden Markov Models in Speech Recognition" Foundations and Trends in signal Processing vol. 1 No. 3 (2007) 195-304.

Micheal A. Nielsen, Chapter 3, "Nueral Networks and Deep Learning", Determination press, 2015.

Yajie Miao, "An Empirical Exploration of CTC acoustic models" Mar. 2016.

* cited by examiner

INITIALIZATION OF CTC SPEECH RECOGNITION WITH STANDARD HMM

FIELD OF THE INVENTION

The present disclosure relates to the computer implemented speech recognition. More specifically the present disclosure is related to speech recognition using Connectionist Temporal Classification Networks and Hidden Markov Models.

BACKGROUND OF THE INVENTION

A speech recognition system receives an audio stream and filters the audio stream to extract and isolate sound segments that make up speech. Speech recognition technologies allow computers and other electronic devices equipped with a source of sound input, such as a microphone, to interpret human speech, e.g., for transcription or as an alternative method of interacting with a computer. Speech recognition software has been developed for use in consumer electronic devices such as mobile telephones, game platforms, personal computers and personal digital assistants.

In a typical speech recognition algorithm, a time domain signal representing human speech is broken into a number of time windows, sometimes referred to as frames, and the time domain signal for each frame is converted to a frequency domain signal, e.g., by fast Fourier transform (FFT). This frequency or spectral domain signal is then compressed by taking a logarithm of the spectral domain signal and then performing another FFT. From the compressed signal, a statistical model can be used to determine phonemes and context within the speech represented by the signal. The extracted phonemes and context may be compared to stored entries in a database to determine the word or words that have been spoken.

A speech recognition system may utilize a grammar and dictionary (GnD) organized as a connected graph structure to analyze one or more frames. The graph structure generally includes a plurality of interconnected nodes that correspond to phonemes and terminal points that correspond to words in the GnD. Signals from one or more frames are analyzed by traversing a path through a subset of the nodes to a word.

Speech recognition systems often use a Hidden Markov Model (HMM) at each node within such a graph structure to determine the units of speech in a given speech signal. The speech units may be words, two-word combinations or sub-word units, such as phonemes and the like. Each HMM is a grouping of HMM states that represent a phoneme under a context. By way of example, the context may indicate a preceding or subsequent phoneme extracted from the time domain signal. Each HMM state is a mixture of probability distributions (e.g., Gaussians). Each node is further characterized by an HMM structure that includes a link and a transition probability for each of the HMM states. The combination of HMMs, states, Gaussians and HMM structure for each node in the GnD is sometimes referred to herein as an acoustic model.

The HMM may be characterized by:

L, which represents a number of possible states of the system;

M, which represents the total number of Gaussians that exist in the system;

N, which represents the number of distinct observable features at a given time; these features may be spectral (i.e., frequency domain) or temporal (time domain) features of the speech signal;

$A=\{a_{ij}\}$, a state transition probability distribution, where each $a_{ij}$ represents the probability that the system will transition to the $j^{th}$ state at time t+1 if the system is initially in the $i^{th}$ state at time t;

$B=\{b_j(k)\}$, an observation feature probability distribution for the $j^{th}$ state, where each $b_j(k)$ represents the probability distribution for observed values of the $k^{th}$ feature when the system is in the $j^{th}$ state; and $\pi=\{\pi_i\}$, an initial state distribution, where each component represents the probability that the system will be in the $i^{th}$ state at some initial time.

Hidden Markov Models can solve three basic problems of interest in real world applications, such as speech recognition: (1) Given a sequence of observations of a system, how can one efficiently compute the probability of the observation sequence; (2) given the observation sequence, what corresponding state sequence best explains the observation sequence; and (3) how can one adjust the set of model parameters A, B π to maximize the probability of a given observation sequence.

The application of HMMs to speech recognition is described in detail, e.g., by Lawrence Rabiner in "A Tutorial on Hidden Markov Models and Selected Applications in Speech Recognition" in Proceedings of the IEEE, Vol. 77, No. 2, February 1989, which is incorporated herein by reference in its entirety for all purposes. Human speech can be characterized by a number of recognizable patterns known as phonemes. Each of these phonemes can be broken down in a number of parts, e.g., a beginning, middle and ending part. It is noted that the middle part is typically the most stable since the beginning part is often affected by the preceding phoneme and the ending part is affected by the following phoneme. The different parts of the phonemes are characterized by frequency domain features that can be recognized by appropriate statistical analysis of the signal. The statistical model often uses Gaussian probability distribution functions to predict the probability for each different state of the features that make up portions of the signal that correspond to different parts of different phonemes. One HMM state can contain one or more Gaussians. A particular Gaussian for a given possible state, e.g., the $k^{th}$ Gaussian can be represented by a set of N mean values $\mu_{ki}$ and variances $\sigma_{ki}$. In a typical speech recognition algorithm one determines which of the Gaussians for a given time window is the largest one. From the closest Gaussian one can infer the most probable phoneme for the frame.

Each node in the graph structure corresponds to a phoneme. The HMM, Gaussians, state and HMM structure are used the compute the probability that a measured feature set for a frame corresponds to the phoneme for the node for a given frame. Given the probabilities for each node at each frame probabilities are then computed for possible paths through linked nodes in the GnD that lead to words or phrases. The path having the highest probability is determined selected in order to complete the recognition.

Current developments in neural networks have led to the creation of a new type of network which is uniquely suited to the field speech recognition. This new type of network is called a Connectionist Temporal Classification Recurrent Neural Network (CTC-RNN). The application of CTC-RNN to speech recognition is described in detail, e.g., by Alex Graves et al. in "Connectionist Temporal Classification: Labelling Unsegmented Sequence Data with Recurrent Neural Networks" from In Proceedings of the International Conference on Machine Learning ICML 2006, which is incorporated herein by reference in its entirety for all purposes. A CTC-RNN models network outputs as probability distribution over all possible label sequences, conditioned on a given input sequence. A backwards forwards propagation algorithm with gradient descent is used to train the network. Typically a CTC-RNN has an output layer that uses a softmax function and there is one more unit than there are labels L. This extra unit represents the observation of a blank or no label. These outputs together define the total probabilities of aligning all possible label sequences with the input sequence. The total probability of any one label sequence can be found by adding up the probabilities of its different alignments.

These CTC-RNNs are potentially better than the current HMMs because they do not require segmented training data or post-processing of outputs. A major drawback of CTC-RNNs is that training CTC-RNNs from scratch to recognize speech does not always result in the optimal convergence. In other words a CTC-RNN trained using an initial random distribution of transition may not always converge on the correct output for the input variable in the least number of steps despite optimization. Thus it would be desirable for there to be some way to ensure optimal convergence after optimization.

It is within this context that aspects of the present disclosure arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Figure 1:
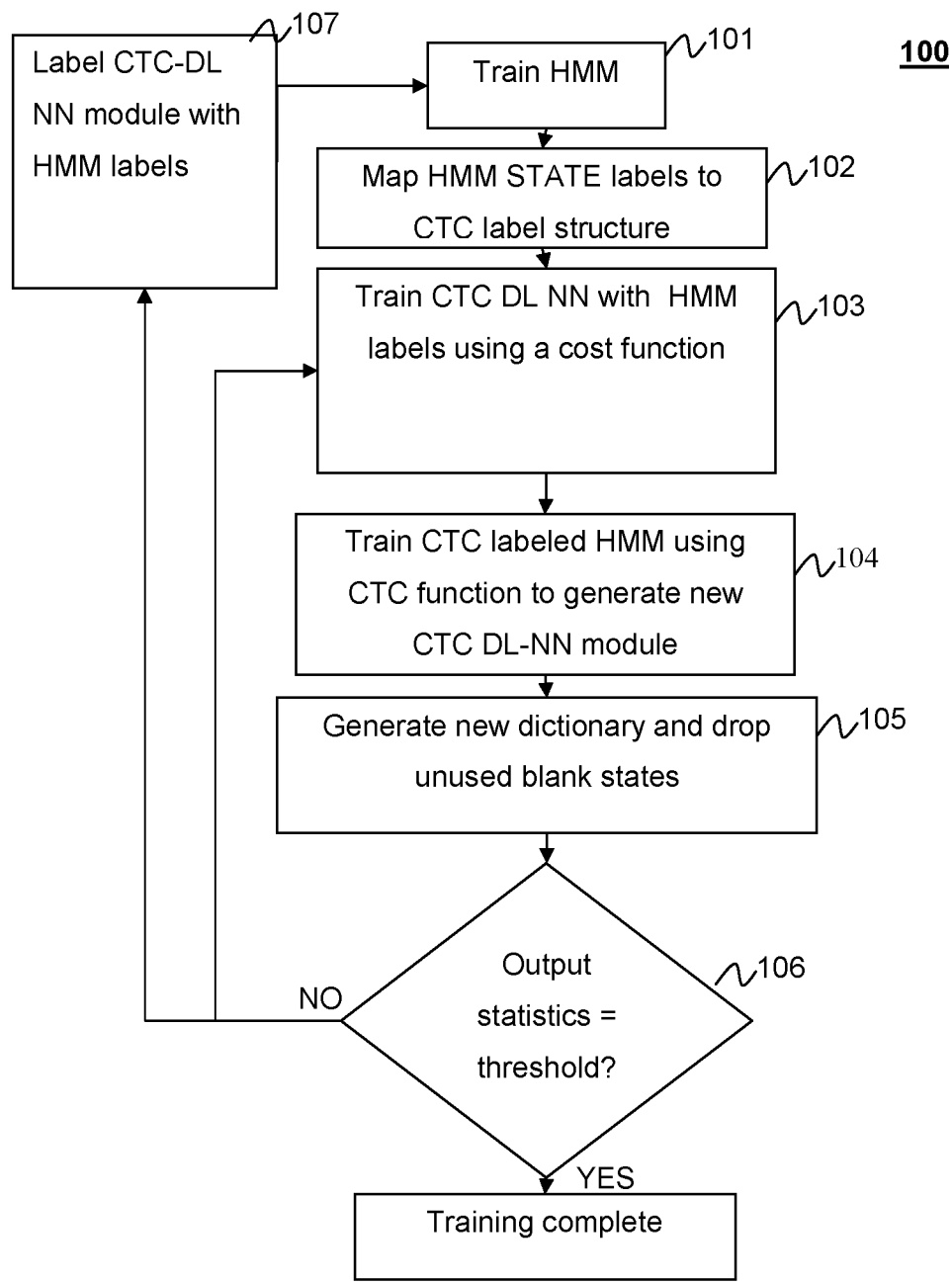
FIG. 1 is a block diagram of the method for initialization of CTC recognition with standard HMM according to aspects of the present disclosure.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

CTC-RNN provides a system that may produce input independent outputs without segmentation, post processing or a priori knowledge of the input alignment. Use of CTC-RNN in the field of speech recognition has been hampered by the fact that CTC do not always attain optimal convergence. On the other hand Gaussian Mixed Model-Hidden Markov Model systems have attained significant success in error free recognition of speech by applying some a priori knowledge that has proven to be effective. Thus it would be desirable to combine the successful speech recognition node layout from the HMM with the flexibility of the CTC model. As such what is proposed is initializing a CTC Deep Learning Neural Network for Speech recognition with the alignments and frames of an HMM speech recognition.

Generally HMM based speech recognizers use 3 state phonemes to accurately represent context dependent pronunciations of words. For example the words mood and cool both have oo but are pronounced differently, by adding beginning and ending state representing the preceding and following phones the HMM can derive contextual information about the proper pronunciation of oo. The selection of all possible phones combined with every possible preceding and every possible following phones are called logical phones. Each real pronunciation may be discovered from a pronunciation dictionary and mapped to the set of logical phones which may then be mapped to physical models and/or tied to like pronunciations. Thus within the HMM based recognizer generally, phonemes are represented by 3 states. An important constraint of the HMM recognizer is that each input speech frame must be properly aligned with an output sequence e.g. pronunciation or word. This alignment between pronunciation and word must be learned apriori from a pronunciation dictionary and mapped to the logical phones. Thus the capability of an HMM to learn new context dependent pronunciations is limited. CTC based systems are not limited by alignments based on pronunciation dictionaries thus they pose an improvement over traditional HMM based recognizer systems. The CTC DL NN based recognizer learns the alignments based on output phones without the need for a-priori frame labels.

The issue is that without a-priori frame labeling, complete and optimal alignment of input feature vectors to output phonemes is not guaranteed and therefore in the context of commercial speech recognition a CTC based recognizer built from scratch may result in inferior performance compared to a traditional HMM based system. Thus disclosed is a method to reliably achieve optimal alignment of a CTC based recognizer.

Labeling

FIG. 1 shows a method for training and optimizing a CTC DL NN recognizer according to aspects of the present disclosure. A CTC based recognizer is built using the framework of an optimized Hidden Markov Model recognizer 101. As discussed above each frame of the MINI recognizer has three states. The middle state of these three states is the most important while the preceding and following states represent context dependent pronunciation information. Each of these three states is labeled as a single phoneme and a linked series of phonemes forms a word. Each word may be separated from a prior or subsequent word by an end condition or a silent state. A MINI based recognizer must have its states mapped to CTC states 102 to convert the HMM recognizer to a CTC recognizer.

As used hereinafter the term mapping may describe either the generation of a new node network model with identical connections and transition weights as the previous model but new labels or relabeling the existing node network model with new labels.

Figure 2:
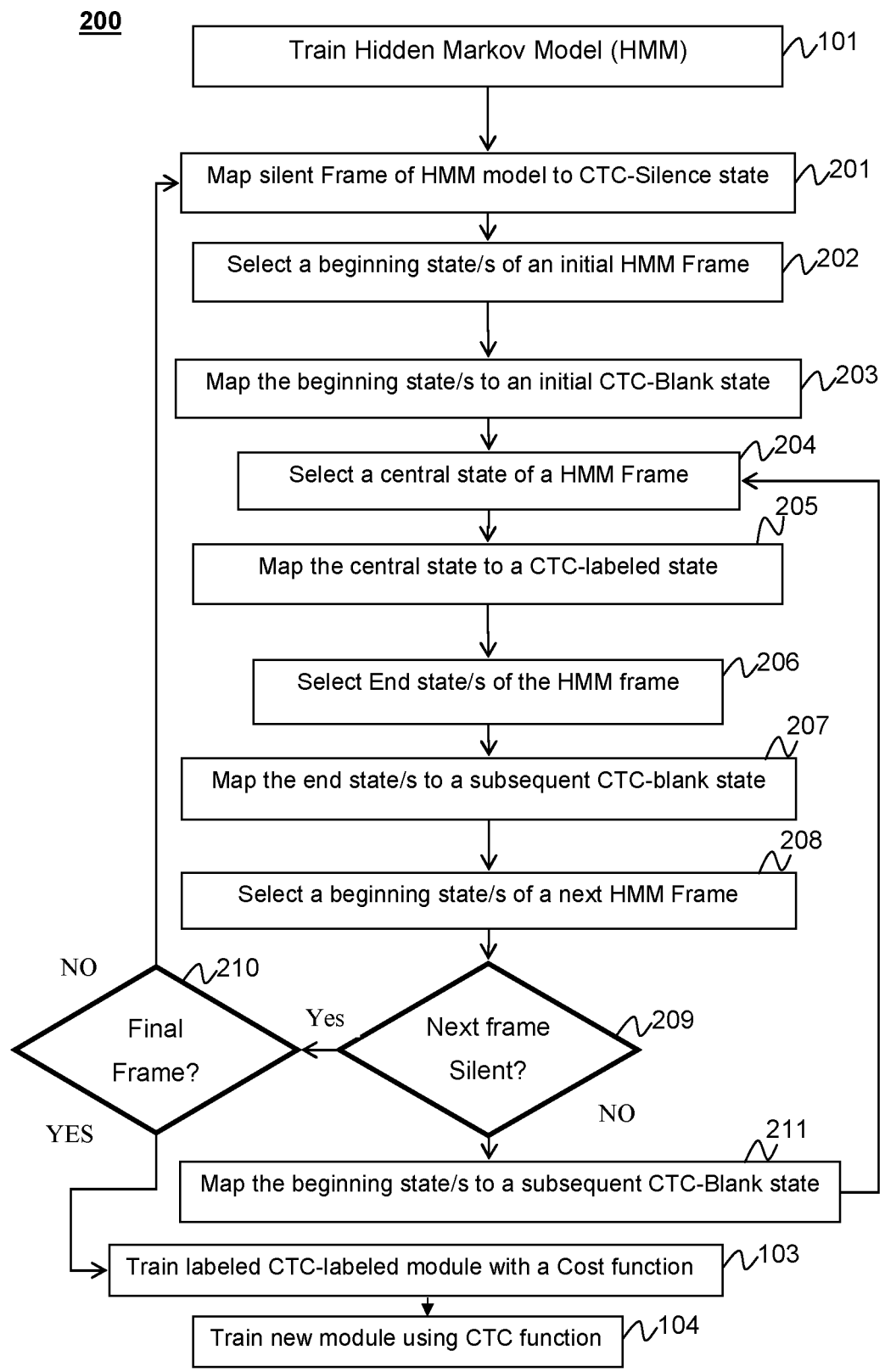
FIG. 2 is a block diagram of the method for relabeling HMM states to a CTC-Labeling scheme according to aspects of the present disclosure.

FIG. 2 describes the method of mapping a MINI states to a CTC states according to aspects of the present disclosure. Initially each silent state in the HMM is mapped as a CTC-silent state 201. The CTC-silent state is three state labels that represent the silent state in a traditional HMM based recognizer. It should be noted that typically CTC based recognizers have a single state that retains the label for a particular phoneme and a blank state may separate each labeled state. In this model the CTC-Silent state is special because it retains the three state structure inherited from the HMM recognizer initially. A reason for this construction is to maintain frame alignment between the CTC frames with the HMM. Once the CTC recognizer is trained with the CTC function the necessity for the rigid 3 state silent function may decrease and one or more states of the function may be eliminated.

According to aspects of the present disclosure once silent states in the HMM are mapped as CTC-silent states, phoneme states are mapped. To map phoneme states the beginning phoneme in a series is selected 202 and the first state is mapped to a CTC-blank state 203. That is, a phoneme either immediately following a beginning condition or a phoneme immediately following a CTC-silent has the first state in the set of three mapped as a CTC-blank state. This measure maintains the alignment of frame of the HMM to the CTC frames.

Next the central state of the HMM is selected 204. The central state mapped as a CTC output 205 retaining the identity of the HMM three state frame-wise labeling. By way of example and not by way of limitation a HMM frame labeled as phoneme sound "I" will have the central state of the frame labeled as the CTC output state "I".

Finally the end state of the HMM frame is selected 206 and is mapped to a CTC-blank state 207. In other embodiments the end state of an initial frame may be merged with the beginning states of a subsequent frame. In addition subsequent frames may have beginning and end states merged with prior and former frames to create a structure more similar to known 2 state CTC structures. Some implementations may perform merging by simply removing the beginning state of the second and subsequent phonemes in a series.

In other embodiments the end state of each phoneme is removed. In these embodiments the final state of a phoneme frame series should be kept. The final state should be labeled as a CTC-blank state. In other words, the last state of the last word in an HMM is labeled as a CTC-blank state.

This mapping process may then be performed for each frame in the HMM through iteration. The next beginning state is the selected 208. The system checks if the selected beginning state is part of a silent frame 209. If the beginning state is not a part of a silent frame then the state mapped to a CTC-Blank state 211. In embodiments where the beginning states and end states frames in a series are merged the beginning state of subsequent frames may not be mapped and the system will move to mapping the central state 204 or two consecutive blank states may be merged in to a single blank state. Once the beginning state of the frame has been mapped or merged, the process will map the central state of the new frame 204 to a CTC-output state 205. After the central state has been mapped the system will select the end state of HMM 206 map the end state to CTC-blank state 207. In some embodiments where the beginning states and end states of frames in a series are merged. The end state of each frame until the final frame in the series may not be mapped and the system will move to mapping the next frame. Finally the system will select the beginning state of the next frame 208. The system will check if the next frame is a silent frame 209. If the next frame is not a silent frame the system will start the iteration as described above. If the beginning state of the next frame is part of a silent frame the system then checks if the silent frame is a final frame 210. If the frame is not a final frame then the next frame is mapped as a CTC-silent frame 201 and the process resumes 200. If the system determines at 210 that the frame is a final frame then the system will proceed to train the new CTC-labeled HMM 103.

Figure 3:
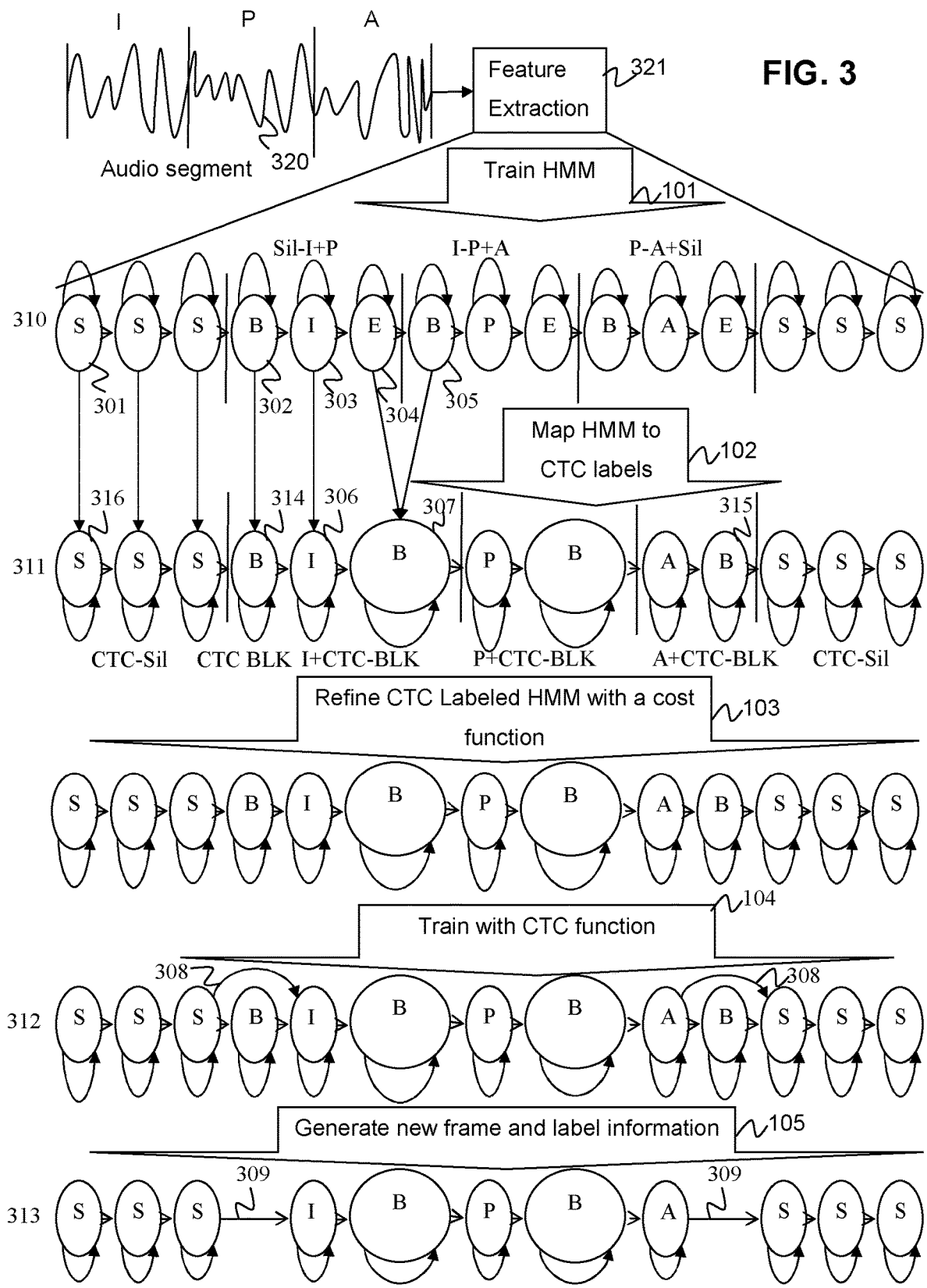
FIG. 3 is a diagram showing the method for initialization of CTC recognition system with standard HMM, starting with training of an HMM using audio input and feature extraction according to aspects of the present disclosure.

FIG. 3 depicts graphical representations of the GMM-HMM 310 and iterations of the CTC-labeled HMM 311, CTC model 312 and CTC model optimization 313 generated through the method 100 according to aspects of the present disclosure. An audio segment containing the phonemes, "I P A" 320 is used to train the GMM-HMM 310. First features are extracted 321 from the audio segment using the Mel frequency cepstrum coefficients or other speech feature representation. The GMM-HMM is then trained 101 using the extracted features as disclosed above. As can be seen there are three silent states 301 in the GMM-HMM and each frame has a beginning state 302, middle state 303 and end state 304. The GMM-HMM 320 may be mapped to CTC labels 102 to form a CTC-labeled HMM 311. Each silent state 302 is directly mapped to a CTC silent state 316. As discussed above the beginning state 302 of the first frame of the GMM-HMM 310 is mapped to the first blank state 314 in the CTC-labeled HMM 311. The middle state 303 of the GMM-HMM 310 is then mapped to a labeled state 306 in the CTC-labeled HMM. The labeled state of the CTC-labeled HMM inherits the frame label of from the GMM-HMM this can be seen from the labeling on each of the states. The middle state 303 of the GMM-HMM is labeled I and the mapped state 306 in the CTC-labeled HMM 311 has this label as well. In the shown embodiment the end state 304 of the first frame and the beginning state of the next frame 305 are merged in the mapping process to create as single blank state 307. This mapping process continues until the state 315 before silence fame. This last state is never merged to ensure that there is alignment.

Figure 4:
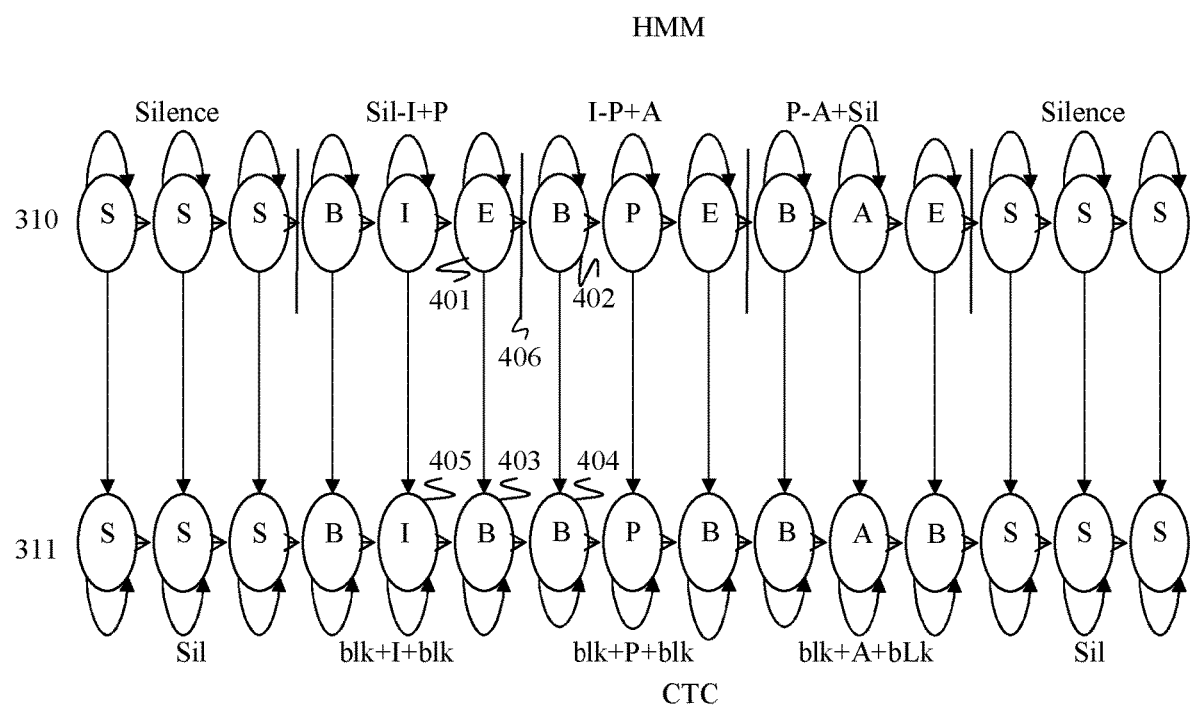
FIG. 4 is a diagram showing mapping of HMM states to CTC states according to aspects of the present disclosure.

FIG. 4 shows another embodiment of the present disclosure in which states are not merged. Each state in the GMM-HMM 310 is directly mapped to each state in the CTC-labeled HMM 311. As can be seen the last state of the first coding frame 401 in the HMM 310 is mapped to a CTC blank state 403 following first output CTC state 405 in the CTC-labeled HMM 311. The beginning state 402 of the next frame 406 of the HMM 310 is mapped to the next blank state 404 in the CTC-labeled HMM 311. In this embodiment the CTC recognizer primed with the exact frame alignment of the original HMM to ensure convergence. After training with CTC cost function some of the blank labels used for mapping HMM alignments to the CTC recognizer may be unnecessary.

It should be apparent from the above disclosure that though mapping is described in the context of a three state context sensitive HMM based recognizer. It is not so limited and this method of mapping may be used to relabel any frame size HMM.

Cost Function Training

After the new CTC-labelled HMM has been created 102 it is trained with a cost function 103 such as a cross entropy cost function, minimum square error functions, a quadratic cost function, an exponential cost function and the like. This ensures that the CTC-labelled HMM is properly aligned with the labeled phonemes. This step is especially important when the end state of a first frame is merged with the beginning state of the next frame as the actual phoneme sound may become misaligned with the output state.

CTC-Function Training

Once convergence is obtained and the CTC-Neural Network (NN)-labelled HMM is trained using a Regular Cost Function like CE (Cross Entropy) or MSE (Minimum Square Error) or other, the CTC cost function 104 can be then used in converting the CTC-NN-labelled HMM to a CTC recognizer. At this point the CTC-NN can be further optimized using the CTC Cost Function. The CTC Cost Function is a forward backward algorithm similar to the one described by Rabiner and further described in Graves et al. Training the Neural Network is then performed using a gradient optimization algorithm.

Turning back to FIG. 3, it can be seen that after training with the CTC cost function 104 certain states of the CTC model 312 have become more weakly predicted or skipped as indicated at 308. That is, these states were useful in alignment of the GMM-HMM but are not needed due to the self-aligning features of the CTC model.

Iterative Training

After the CTC recognizer has trained with been with the CTC-function, blank labels can be removed 105. For example, blank labels that have probabilities that fall below a certain threshold may be removed or have their probabilities set to zero.

Turning again to FIG. 3, the optimized CTC model 313 has had the weakly predicted states 308 removed 105 from the model resulting in situation where the silent state transfers directly 309 to a CTC-labeled state. Thus the optimized CTC model 313 has lost some of the direct correlation to the HMM model 310 but ideally it has gained some efficiency and better accuracy.

Further optimizations to the CTC recognizer may be implemented by decoding the CTC recognizer and generating a new dictionary based on new phoneme labeling found 105. To decode the CTC recognizer the system may use by way of example and not by way of limitation, prefix search decoding or best path decoding. Alternatively new phone labels may be created by using dictionaries with alternate pronunciation per word.

The optimized CTC recognizer may then be iteratively trained by generating a new GMM-HMM using the CTC labelings and the new dictionary. To generate a new GMM-HMM from the CTC recognizer, CTC states are mapped to HMM states 107. Mapping is performed in basically a reverse of mapping HMM to CTC states. Thus first CTC-silent states are mapped to the triple silent states of the context bases GMM-HMM. The labeled states of the CTC recognizer are then mapped to the middle states each GMM-HMM frame. CTC-Blank states are merged with either beginning or end states of each frame in the GMM-HMM. Where a state has been merged or removed, a new beginning or end state is added to satisfy the three state condition of context sensitive GMM-HMM. Once the converted back to GMM-HMM labeling 107, the model may be trained with the GMM-HMM training methods 101 as described above and then remapped to CTC 102 and retrained 103, 104 according to aspects of the present disclosure. Once trained a second new dictionary may be generated and any unused blank states may be dropped 105.

In alternative embodiments the CTC model is trained for a second time with the new dictionary, phoneme labels and dropped blank states. First the CTC model is trained with a Regular Cost Function such as a cross entropy cost function 103 then the CTC model may be trained using the CTC cost function 104 as disclosed above for the CTC-labeled HMM. Once trained additional unused blank states may be dropped if they are found and a second new dictionary may be generated 105.

This process of training conversion and/or retraining of the CTC recognizer hereinafter referred to as iterative training, may be repeated many times until the CTC-recognizer produces a satisfactory result 106. A satisfactory result may be satisfying a threshold labelling accuracy for some development set of inputs or when there is reduction in the recognition probability or when the net change recognition probability is equal to or less than zero for one or more iterations.

Computing Device

Figure 5:
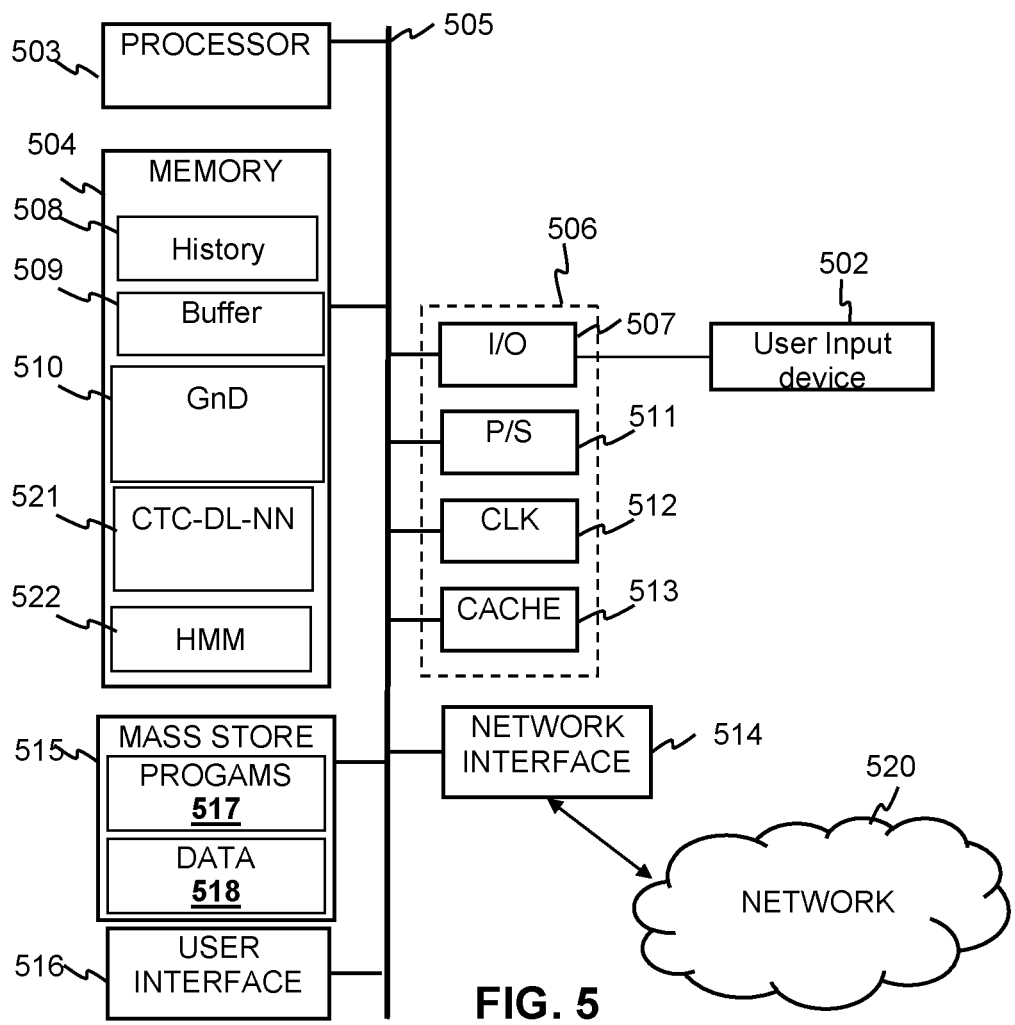
FIG. 5 is a block diagram of a system for implementing the method for initialization of CTC recognition with standard HMM according to embodiments of the present disclosure.

FIG. 5 depicts a system according to aspects of the present disclosure. The system may include a computing device 500 coupled to a user input device 502. The user input device 502 may be a controller, touch screen, microphone or other device that allows the user to input speech data in to the system.

The computing device 500 may include one or more processor units 503, which may be configured according to well-known architectures, such as, e.g., single-core, dual-core, quad-core, multi-core, processor-coprocessor, cell processor, and the like. The computing device may also include one or more memory units 504 (e.g., random access memory (RAM), dynamic random access memory (DRAM), read-only memory (ROM), and the like).

The processor unit 503 may execute one or more programs, portions of which may be stored in the memory 504 and the processor 503 may be operatively coupled to the memory, e.g., by accessing the memory via a data bus 505. The programs may be configured to implement training of a MINI 101. Additionally the Memory 504 may contain one or more Grammar and Dictionaries (GnD) 510 for the HMM and CTC training processes. The Memory 504 may also contain probabilities and extracted features computed for the recognition of phonemes stored as history 508. The Memory 504 may also contain software modules such as a Grammar and Dictionary (GnD) Module 510, a CTC Deep Learning Module 521 and an HMM Module 522. The history 508 may be used with the GnD 510 to recognize words and sentences with the HMM. The overall structure and probabilities of the HMM may also be stored as data 518 in the Mass Store 515. The processor unit 503 is further configured to execute one or more programs 517 stored in the mass store 515 or in memory 504 which cause processor to carry out the method 100 of training a CTC recognizer from a HMM recognizer. The system may generate Neural Networks as part of the CTC refinement process. These Neural Networks may be stored in memory 504 as part of the CTC Deep Learning Module 521. Completed CTC recognizers may be stored in memory 504 or as data 518 in the mass store 515. The programs 517 (or portions thereof) may also be configured, e.g., by appropriate programming, to implement the method 200 of relabeling HMM states to a CTC-Labeling scheme as discussed above with respect to FIG. 2. In addition the programs 517 (or portions thereof) may be similarly configured to implement initialization of CTC recognition system with standard HMM, starting with training of an HMM using audio input and feature extraction as discussed above with respect to FIG. 3. Furthermore, the programs 517 (or portions thereof) may also be configured to map MINI states to CTC as discussed above with respect to FIG. 4.

The computing device 500 may also include well-known support circuits, such as input/output (I/O) 507, circuits, power supplies (P/S) 511, a clock (CLK) 512, and cache 513, which may communicate with other components of the system, e.g., via the bus 505. The computing device may include a network interface 514. The processor unit 503 and network interface 514 may be configured to implement a local area network (LAN) or personal area network (PAN), via a suitable network protocol, e.g., Bluetooth, for a PAN.

The computing device may optionally include a mass storage device 515 such as a disk drive, CD-ROM drive, tape drive, flash memory, or the like, and the mass storage device may store programs and/or data. The computing device may also include a user interface 516 to facilitate interaction between the system and a user. The user interface may include a keyboard, mouse, light pen, game control pad, touch interface, or other device. In some implementations, the user may use the interface 416 to change the viewport, e.g., by scrolling with a mouse or manipulation of a joystick.

The computing device 500 may include a network interface 514 to facilitate communication via an electronic communications network 520. The network interface 514 may be configured to implement wired or wireless communication over local area networks and wide area networks such as the Internet. The device 500 may send and receive data and/or requests for files via one or more message packets over the network 520. Message packets sent over the network 520 may temporarily be stored in a buffer 509 in memory 504.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for improved initialization of speech recognition systems, the method comprising;
   a) mapping a central state of each frame in a trained Hidden Markov Model (HMM) to Connectionist Temporal Classification (CTC) labeled nodes and mapping one or more non-central states of each frame to CTC-blank nodes to generate a CTC-labeled HMM, wherein each central state represents a phoneme, wherein mapping consists of either generation of a new node network model with identical connections and transition weights as a previous model but new labels or relabeling an existing node network model with new labels;
   b) training the CTC-labeled HMM using a cost function wherein the cost function is not part of a CTC cost function;
   c) training the CTC-labeled HMM using a CTC cost function to produce a CTC node Deep Learning Neural network; and
   d) generating new frame and label information from the CTC-node network.

2. The method of claim 1 wherein generating new frame information comprises omitting blank labels that are not used by the CTC node Deep Learning Neural Network.

3. The method of claim 1 wherein generating new label information comprising searching for new phone labels using alternative pronunciation dictionaries for each word.

4. The method of claim 1 wherein generating new frame information comprises omitting blank states which fail to satisfy a probability threshold.

5. The method of claim 1 further comprising e) mapping the new frame and new label information to an HMM node network to generate a refined HMM and training the refined HMM with a cost function.

6. The method of claim 5 wherein mapping the new frame and new label information comprises, converting the new label information to an HMM node label scheme.

7. The method of claim 5 further comprising repeating a) through c) using the refined HMM as the trained HMM in a) to generate a refined CTC Deep Learning Neural network.

8. The method of claim 5 further comprising f) repeating a) through e) using the refined HMM as the trained HMM in a) until an output statistic meets a threshold.

9. The method of claim 1 further comprising repeating b) and c) using the new label and frame information.

10. The method of claim 9 further comprising e) repeating b) through d) using the new label and new frame information for each iteration until an output statistic meets a threshold.

11. The method of claim 1 wherein HMM triplet silent states are mapped to triplet CTC-blank states.

12. The method of claim 1 further comprising recognizing phonemes from human speech detected by the computing device.

13. The method of claim 1 wherein the cost function from b) is a Cross Entropy function or a Minimum Square Error function or a soft max function or a quadratic cost function or an exponential cost function.

14. A computing device comprising:
   a processor;
   a memory coupled to the processor;
   non-transitory computer readable instructions embedded in memory which when executed by the processor cause the processor to implement the method for improved initialization of speech recognition systems, the method comprising:
   a) mapping a central state of each frame in a trained Hidden Markov Model (HMM) to Connection Temporal Classification (CTC) labeled nodes and mapping one or more non-central states of each frame to CTC-blank nodes to generate a CTC-labeled HMM, wherein each central state represents a phoneme, wherein mapping consists of either generation of a new node network model with identical connections and transition weights as a previous model but new labels or relabeling an existing node network model with new labels;
   b) training the CTC-labeled HMM using a cost function, wherein the cost function is not part of a CTC cost function;
   c) training the CTC-labeled HMM using a CTC cost function to produce a CTC node network; and
   d) generating new frame and label information from the CTC-node network.

15. The computing device 14 wherein generating new frame information comprises omitting blank states which fail to satisfy a probability threshold.

16. The computing device claim 14 wherein generating new label information comprises searching for new phone labels using alternative pronunciation dictionaries for each word.

17. The computing device of claim 14 further comprising, repeating b) and c) using the new label and frame information.

18. The computing device of claim 14 wherein HMM triplet silent states are mapped to triplet CTC-blank states.

19. The method of claim 14 wherein the cost function from b) is a cross entropy function or a Minimum Square Error function or a soft max function or a quadratic cost function or an exponential cost function.

20. A non-transient computer readable medium containing program instructions for causing a computer to perform the method of:
   a) mapping a central state of each frame in a trained Hidden Markov Model (HMM) to Connectionist Temporal Classification (CTC) labeled nodes and mapping one or more non-central states of each frame are mapped to CTC-blank nodes to generate a CTC-labeled HMM, wherein each central state represents a phoneme, wherein mapping consists of either generation of a new node network model with identical connections and transition weights as a previous model but new labels or relabeling an existing node network model with new labels;
   b) training the CTC-labeled HMM using a cost function, wherein the cost function is not part of a CTC cost function;
   c) training the CTC-labeled HMM using a CTC cost function to produce a CTC node network; and
   d) generating new frame and label information from the CTC-node network.

* * * * *